United States Patent [19]

Hahs, Jr. et al.

[11] Patent Number: 5,731,817
[45] Date of Patent: Mar. 24, 1998

[54] METHOD AND APPARATUS FOR GENERATING A HEXAHEDRON MESH OF A MODELED STRUCTURE

[75] Inventors: Charles Arthur Hahs, Jr., Boca Raton; Emory Douglas Carroll, Boynton Beach, both of Fla.

[73] Assignee: Motorola, Inc., Schaumburg, Ill.

[21] Appl. No.: 541,053

[22] Filed: Oct. 11, 1995

[51] Int. Cl.$^6$ ................................................. G06T 17/00
[52] U.S. Cl. ..................................... 345/423; 345/420
[58] Field of Search ................................. 395/119, 120, 395/123, 124; 345/419, 420, 423, 424

[56] References Cited

U.S. PATENT DOCUMENTS

| | | | |
|---|---|---|---|
| 5,027,281 | 6/1991 | Rekow et al. | 364/474.24 |
| 5,031,120 | 7/1991 | Pomerantz et al. | 364/468.27 |
| 5,115,400 | 5/1992 | Watanabe et al. | 364/474.24 |
| 5,126,646 | 6/1992 | Fujita et al. | 395/120 |
| 5,315,537 | 5/1994 | Blacker | 395/123 |
| 5,442,569 | 8/1995 | Osano | 364/578 |
| 5,522,019 | 5/1996 | Bala et al. | 395/124 |
| 5,553,206 | 9/1996 | Meshkat | 395/123 |

OTHER PUBLICATIONS

EB Model, Economical Granite Bridge CMM, Numerex Corporation, Industrial Products Division, 1988.
CS Series, Ceramic Superstructure CMM, Numerex Corporation, 1988.
UM System, Unimeasure Software, Numerex Corporation, 1988.
DB Series Dual Beam CMM, Numerex Corporation, 1989.
UT System, Uni-Touch Coordinate Measurement System, Numerex Corporation, 1988.

*Primary Examiner*—Phu K. Nguyen
*Assistant Examiner*—Cliff N. Vo
*Attorney, Agent, or Firm*—Gregg E. Rasor

[57] ABSTRACT

A computer (100) for generating a mesh of a computer modeled, mechanical structure includes a data entry device (105) for receiving model data representative of a model and a hexahedron mesher (128) for automatically generating a mesh of the model using hexahedral elements. The hexahedron mesher (128) operates without user intervention other than an initial user-initiated command. The computer (100) also includes an analyzer (140) for performing finite element analysis on the mesh and a presentation device, such as a display (125), for presenting results of the finite element analysis.

24 Claims, 9 Drawing Sheets

36 ELEMENTS

23 ELEMENTS

23 ELEMENTS

1

METHOD AND APPARATUS FOR GENERATING A HEXAHEDRON MESH OF A MODELED STRUCTURE

FIELD OF THE INVENTION

This invention relates in general to generation of a geometric mesh for a modeled structure, and more specifically to generating a mesh of hexahedrons for a model.

BACKGROUND OF THE INVENTION

Conventionally, mechanical structures are modeled on a computer, and then finite element analysis is performed to pinpoint areas of the model that experience different degrees of stresses. Designers can then decide whether selected areas of the actual structure should be strengthened or reinforced. The first step in finite element analysis is deciding which geometric elements should be used to form a "mesh" of the computer model. This decision is based on the available element types, the complexity of the model, and the number of elements that will be required to capture an appropriate shape of the model.

Typically, for electronic device housings, such as pager housings, the elements chosen are shell elements, tetrahedrons, or hexahedrons. However, since most pager housings are composed of over 900 surface faces, have large variations in thickness, and many features normal to the mid-surface, forming a mesh with shell elements is a prohibitive task. Additionally, shell element meshes require mid-surface geometry, which can be difficult, if not impossible, to generate for pager housings.

Tetrahedral elements can produce erroneous results because they are too "stiff." Also, tetrahedrons are not available in all finite element analyzers. Most notably, none of the impact/drop simulation codes allow the use of tetrahedrons.

The best choice, therefore, for forming a mesh of a pager housing model is hexahedrons. Hexahedrons have none of the disadvantages of tetrahedrons, are known to provide very accurate results, can model complex shapes, and are available in all finite element analyzers.

However, computational speeds have reached the point where the time required to solve a finite element problem is no longer the gating item in the analysis. Instead, the bottleneck has shifted to the mesh-building stage. For example, for drop simulation of a pager, the model would comprise a front housing, a back housing, a battery door, a display assembly, and circuit boards. The time for building a mesh of the resulting complex computer model is optimistically estimated as forty (40) days. Even three months would not be an unreasonable estimate. This amount of time is usually not available for most projects. As a result, designers are forced to use less reliable methods for forming meshes of pager housings.

Thus, what is needed is a method and apparatus for rapidly generating hexahedron meshes of computer modeled devices.

DESCRIPTION OF A PREFERRED EMBODIMENT

Figure 1:
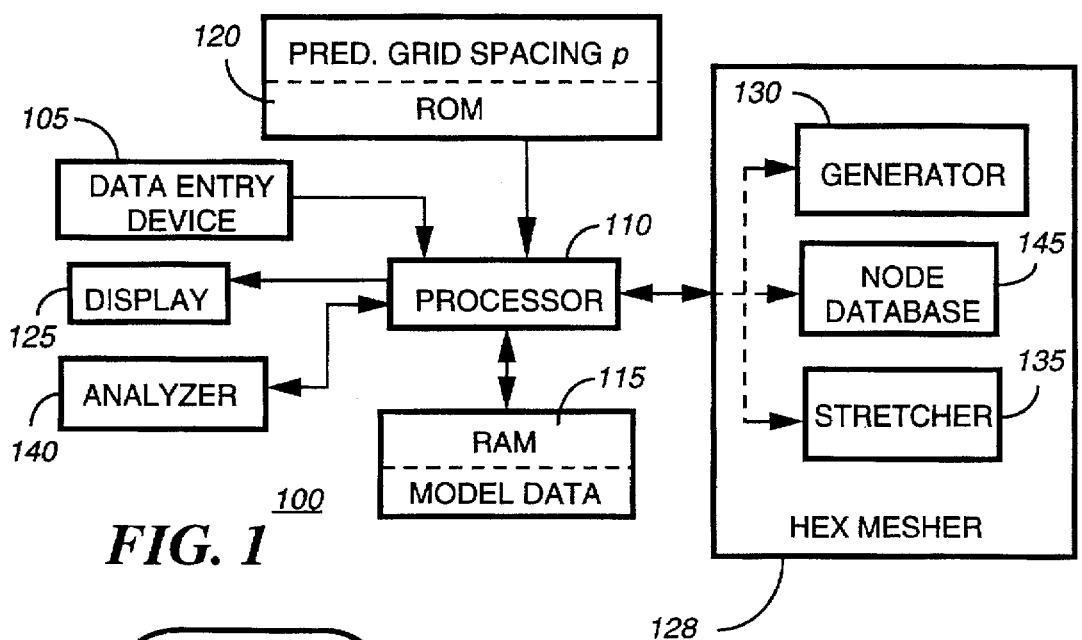
FIG. 1 is an electrical block diagram of a computer for generating a hexahedron mesh of a model in accordance with the present invention.

FIG. 1 is an electrical block diagram of a computer 100, such as a XXX manufactured by XXX, which is capable of performing finite element analysis on a computer model of a mechanical structure. The computer 100 comprises a data entry device 105, e.g., a keyboard, serial data port, modem, etc., for receiving data descriptive of a model. The model could, for instance, comprise a housing for an electronic device, a snap for a housing latch, or a battery door. The data is preferably received in the form of one or more mathematical equations describing surfaces of the model and/or coordinates, based on a known reference point, that define locations on surfaces of the model. It will be appreciated that the model data can also comprise any other data that sufficiently describes the model surfaces.

Figure 2:
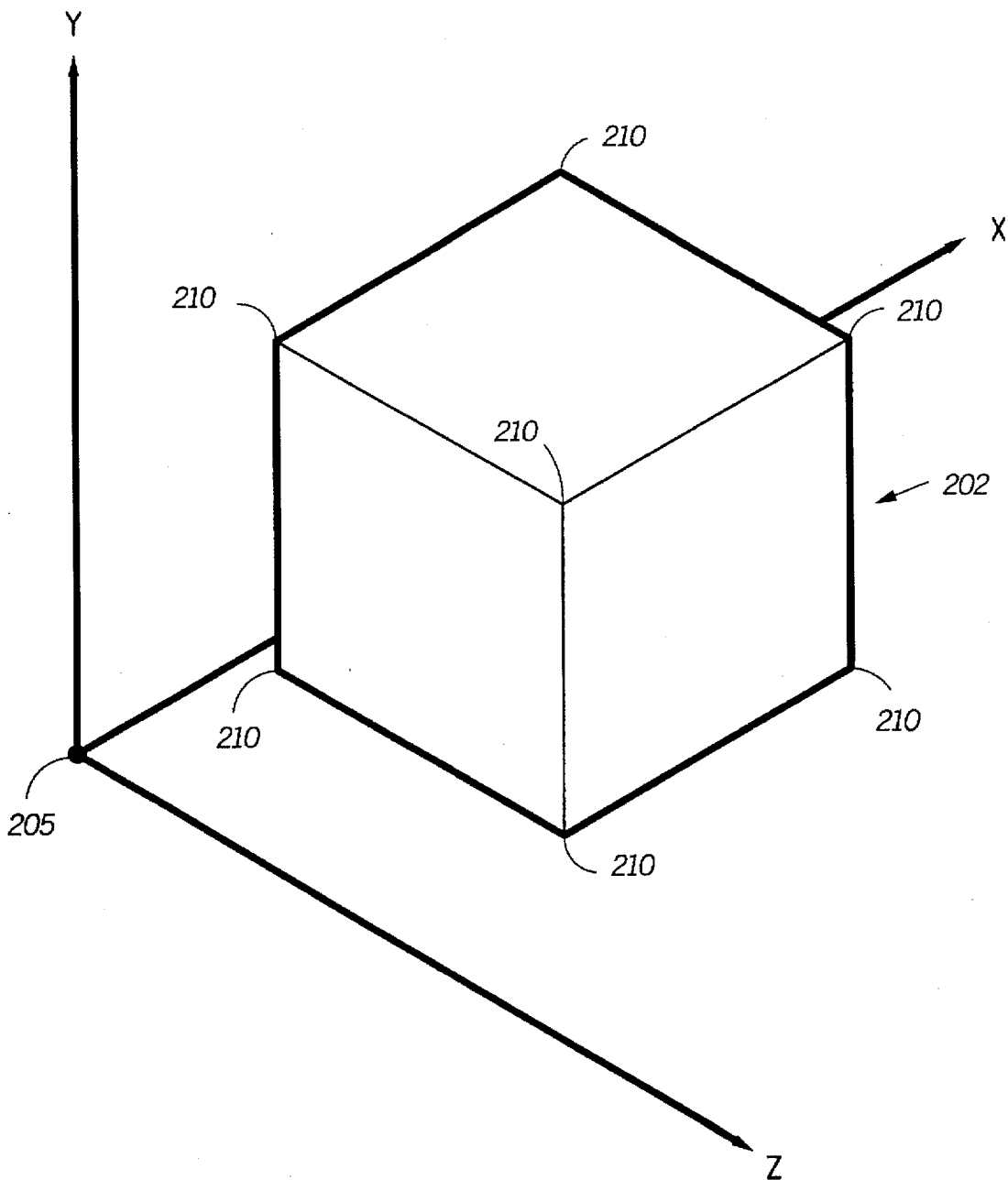
FIG. 2 is a perspective view of a model provided to the computer of FIG. 1 in accordance with the present invention.

FIG. 2 is a perspective view of a simple model 202 that could be processed by the computer 100. In such a circumstance, the model data could comprise information indicative of a reference point 205 in addition to coordinates of corners 210 of the illustrated model 202. The model data could further include mathematical equations that represent the straight lines running between the appropriate corners of the model 202. It will be appreciated that the extremely simple model 202 of FIG. 2 is depicted for illustrative purposes only. In actuality, it is likely that most models will be much more complex and require a larger amount of model data.

Returning to FIG. 1, the computer 100 further includes a processor 110 coupled to the data entry device 105 for receiving the model data therefrom and a memory, such as a random access memory (RAM) 115, for storing the model data and other variables derived during operation of the computer 100. Another memory, such as a read only memory (ROM) 120, stores firmware executed during operation of the computer 100. A presentation device is also included in the computer 100 for presenting model images to a designer. The presentation device preferably comprises a display 125, such as a conventional computer monitor, for visually displaying information to a designer.

Further included in the computer 100 is a hexahedron mesher 128, which, according to the present invention, discretizes the model into a mesh of hexahedral elements and nodes. The mesher 128 preferably includes an element generator 130 for creating an initial hexahedron mesh for the model. The hexahedral elements from which the initial mesh is formed are preferably in the form of cubes, although other hexahedral elements can alternatively be used. A node database 145 included in the mesher 128 stores coordinates, based on a known reference point, for the nodes that define each hexahedron of the mesh. The mesher 128 also comprises an element stretcher 135 coupled to the processor 110 for "stretching" nodes of selected hexahedrons from their initial locations (represented by the coordinates stored in the node database 145) to locations that lie on or near surfaces of the model. The element generator 130, element stretcher 135, and node database 145 included in the hexahedron mesher 128 are preferably implemented in firmware and stored in the computer 100.

The hexahedron mesher 128 according to the present invention automatically generates a mesh of hexahedrons to approximate the model. As a result, time is not wasted in which a human operator must individually place elements on the surface of the model and/or within the model to manually generate a mesh. This can save weeks and even months for complex models, such as pager housings or fastening devices.

The computer 100 preferably also includes an analyzer 140 for performing finite element analysis of the model based on the hexahedron mesh in a conventional manner. The conventional analyzer 140 determines the response of the model to several different input conditions. For example, the analyzer 140 can determine bending and torsional stiffness, stresses at different regions of the model, and assembly or retention forces for fastening schemes. The analyzer 140 can, for instance, be implemented by using a XXX manufactured by XXX.

Figure 3:
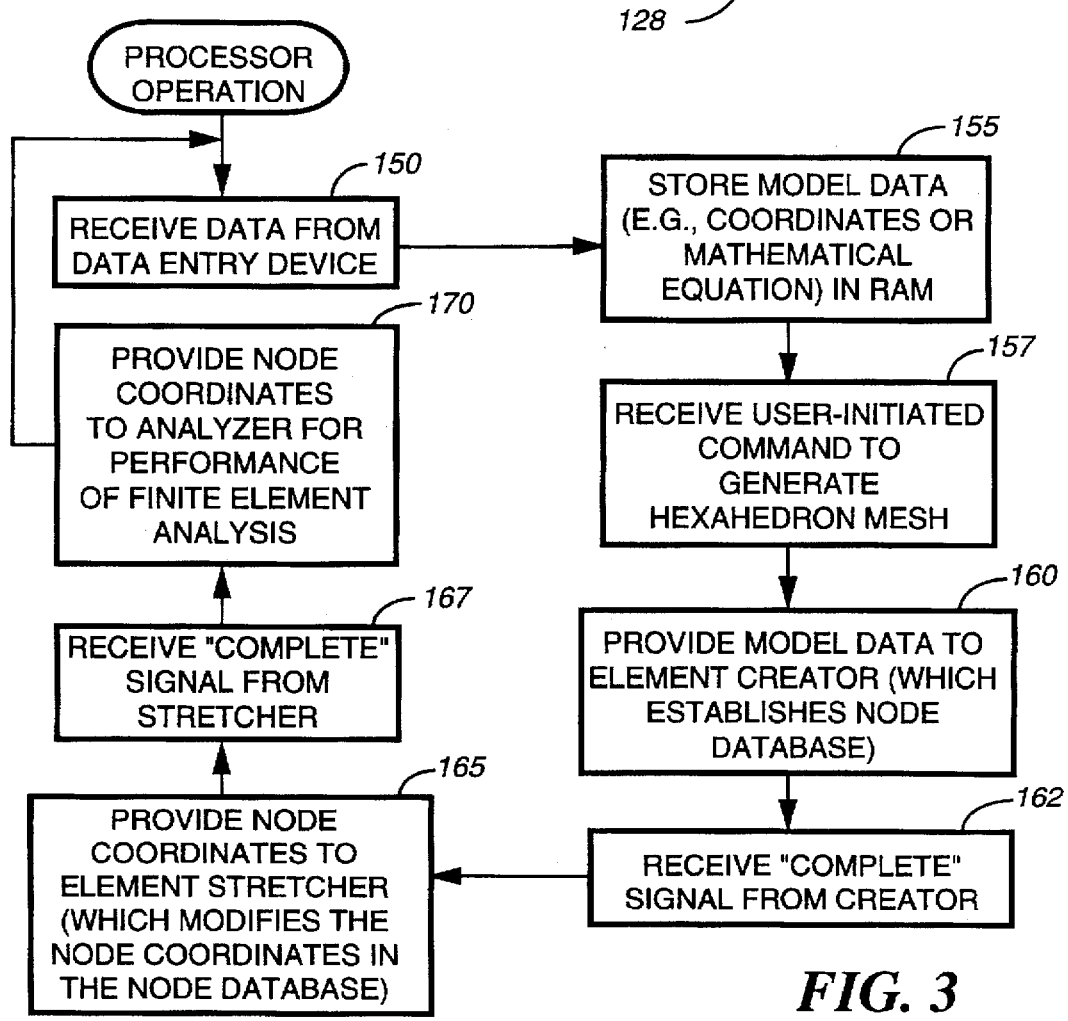
FIG. 3 is a flowchart illustrating an operation of a processor included in the computer of FIG. 1 in accordance with the present invention.

Referring next to FIG. 3, a flowchart depicts an operation of the processor 110 according to the present invention. At step 150, the processor 110 receives data representative of a modeled structure from the data entry device 105 (FIG. 1). The model data is then stored, at step 155, in the RAM 115, preferably in the form of coordinates with a known reference point or as one or more mathematical equations, or perhaps a combination of both coordinates and equations. Next, a user input is received, at step 157, to indicate that a mesh should be created for the model. The user input can be provided, for example, via the data entry device 105. Next, the model data is provided, at step 160, to the element generator 130 included in the mesher 128. The element generator 130 then creates an initial mesh comprising hexahedral elements and stores coordinates of nodes defining the elements in the node database 145.

Once the processor 110 receives, at step 162, a "complete" signal, indicating that the node database 145 has been established, the processor 110 provides the node coordinates to the stretcher 135, at step 165. The stretcher 135 modifies the node coordinates, i.e., "stretches" selected elements in the mesh, to more accurately represent surfaces of the model, then transmits a "complete" signal that is received by the processor 110, at step 167. At step 170, the processor 110 provides the node coordinates of the elements included in the completed mesh to the analyzer 140, which performs finite element analysis in a well known manner.

According to the present invention, after the designer inputs an initial user-initiated command, at step 157, to begin the process of generating the hexahedron mesh, the creation of the mesh (step 160 through step 167) occurs automatically; no further manual entry of data and no further human intervention is required. Additionally, the provision of the node coordinates to the analyzer 140, at step 170, can also occur automatically if desired. There may be situations, however, where it is preferred to postpone performance of finite element analysis until later. In such a case, performance of finite element analysis can be deferred by requiring a further user input prior to providing the node coordinates to the analyzer 140.

Figure 4:
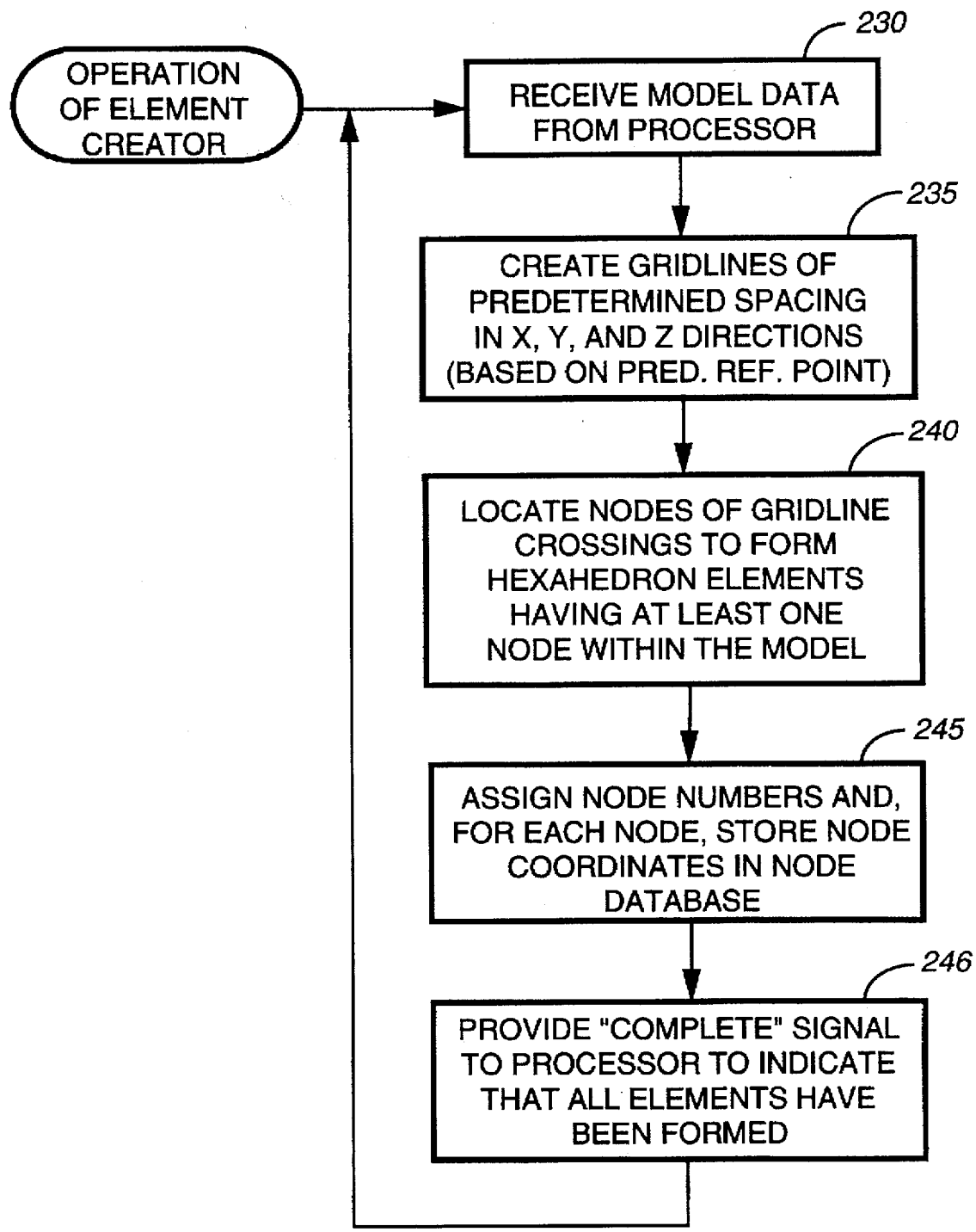
FIG. 4 is a flowchart of an operation of an element generator included in the computer of FIG. 1 in accordance with the present invention.

FIG. 4 is a flowchart of the operation of the element generator 130 included in the mesher 128 according to the present invention. The generator 130, at step 230, receives the model data from the processor 110, then, at step 235, creates gridlines originating at a predetermined reference point. The gridlines are preferably formed in three dimensions, e.g., along x, y, and z axes, at predetermined intervals so that the model is intersected in three dimensions. Depending upon the complexity of the models to be analyzed, the intervals can be pre-programmed into the ROM 120 prior to the meshing operation by using the data entry device 105.

After generating the gridlines, the element generator 130 locates the gridline crossings, i.e., the "nodes", that define hexahedrons having at least one node within the model. This is done by referencing the model data and the predetermined reference point of the gridlines to determine which nodes fall within the structure defined by the model data. Once the element generator 130 has formed hexahedral elements having at least one node within the model, node numbers are assigned, at step 245, and node coordinates for each node are stored in the node database 145. The element generator 130 then generates a "complete" signal, at step 246, to indicate to the processor 110 that an initial hexahedron mesh of the model has been formed.

Figure 5:
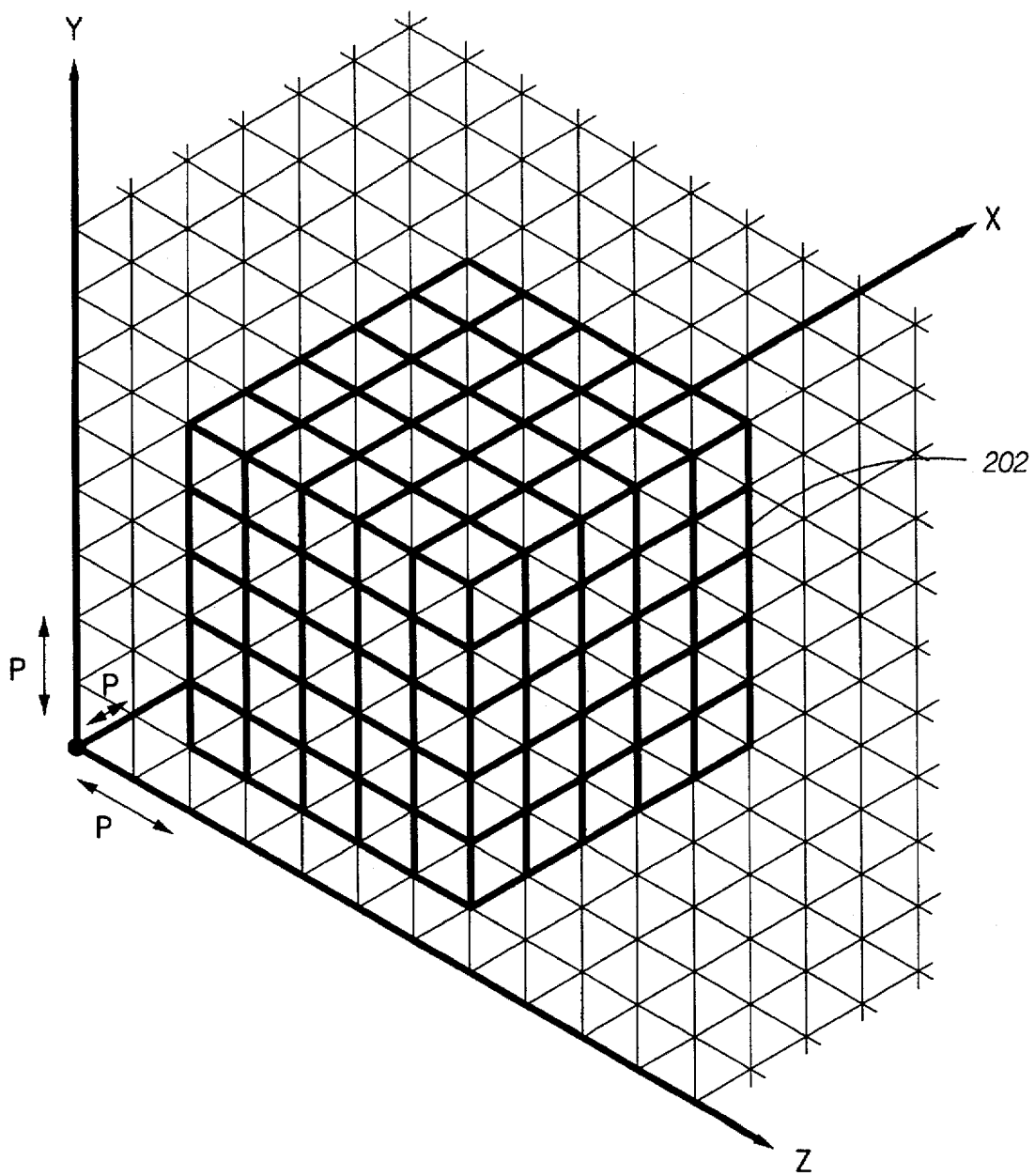
FIG. 5 is a perspective view of the model of FIG. 2, intersected by gridlines generated by the element generator of FIG. 4 in accordance with the present invention.

FIG. 5 shows an illustration of a simple model 202 after intersection by the gridlines. In this illustration, the element generator 130 has generated a plurality of gridlines along the x, y, and z axes. Each gridline is a predetermined distance p from other gridlines formed along the same axis. It can be seen that the gridlines intersect the model 202 at a plurality of nodes to define hexahedral elements, e.g., cubes, having a length, width, and height of p. However, when the hexahedral elements are not cubes, the spacing of the gridlines is not necessarily uniform. For example, the gridline spacing for generating non-cubical hexahedrons could be n for the x axis, p for the y axis, and q for the z axis, where, p, and q are not equal.

In the illustrated model 202, all of the hexahedrons fall within the model 202. However, it will be appreciated that for a non-rectangular model, many of the hexahedrons forming the mesh are likely to include one or more nodes that fall outside the model, thereby forming a mesh which does not accurately follow the contours of the model surfaces. Instead, the initial hexahedron meshes for non-rectangular models are likely to only approximate model surfaces.

Figure 6:
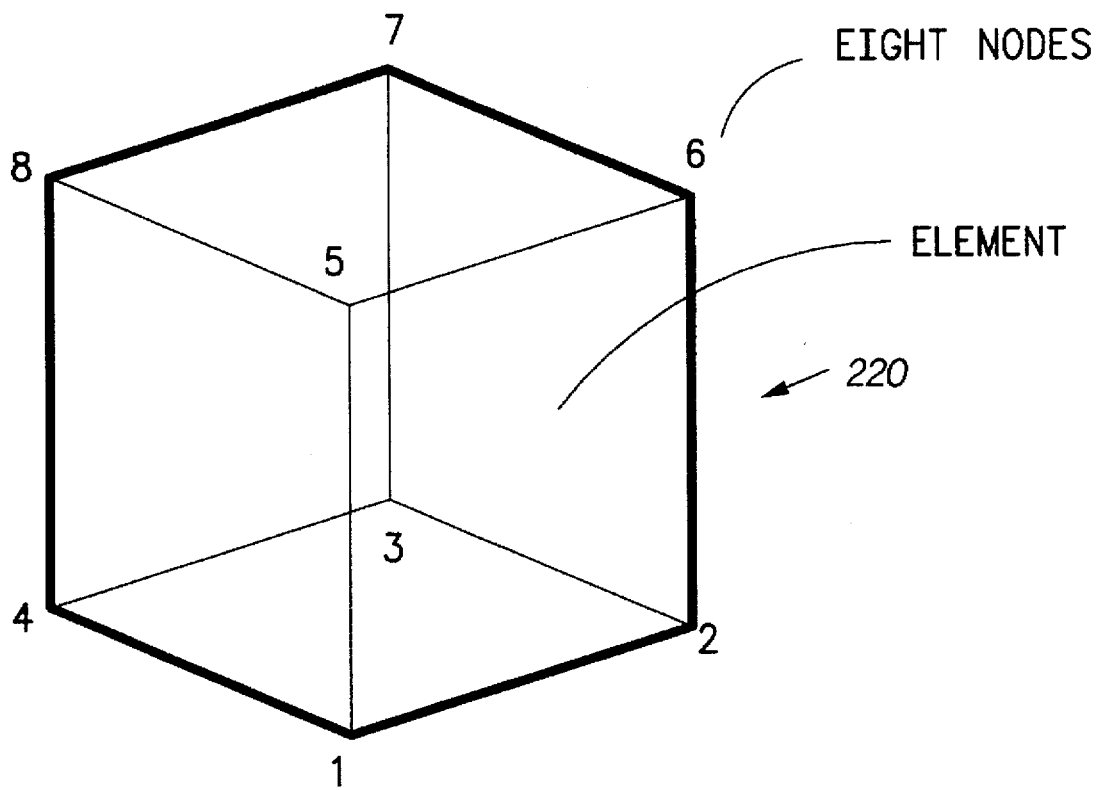
FIG. 6 is a perspective view of a hexahedron used by the element generator of FIG. 4 to create a mesh of a computer model in accordance with the present invention.

FIG. 6 is a perspective view of a hexahedral element 220, such as a cube, that is preferably utilized by the element generator 130 for generating the initial mesh. The element 220 includes eight nodes that are assigned coordinates by the generator 130 when the element 220 is determined to have at least one node included within a model. In other words, when the element 220 is to be included in the initial mesh, coordinates of the nodes are determined. The coordinates for each of the eight nodes are then stored by the generator 130 in the node database 145 (FIG. 1). The element generator 130 could, for instance, number each element included in the mesh, assign numbers "one" through "eight" to each of the nodes for that element, then store the node coordinates with reference to the node and element numbers. It will be understood, though, that any method for storage can be used as long as the node coordinates for each mesh element can be discerned. The size of the element 220 can also be programmed into the computer 100, such as by using the data entry device 105. The size can, for example, be represented by pre-programmed variables for height, length, and width. It will be understood that, for a cube, only one variable would be necessary since the height, length, and width are equal. For non-cubical hexahedrons, the variables representative of element size may all be different.

Figure 7:
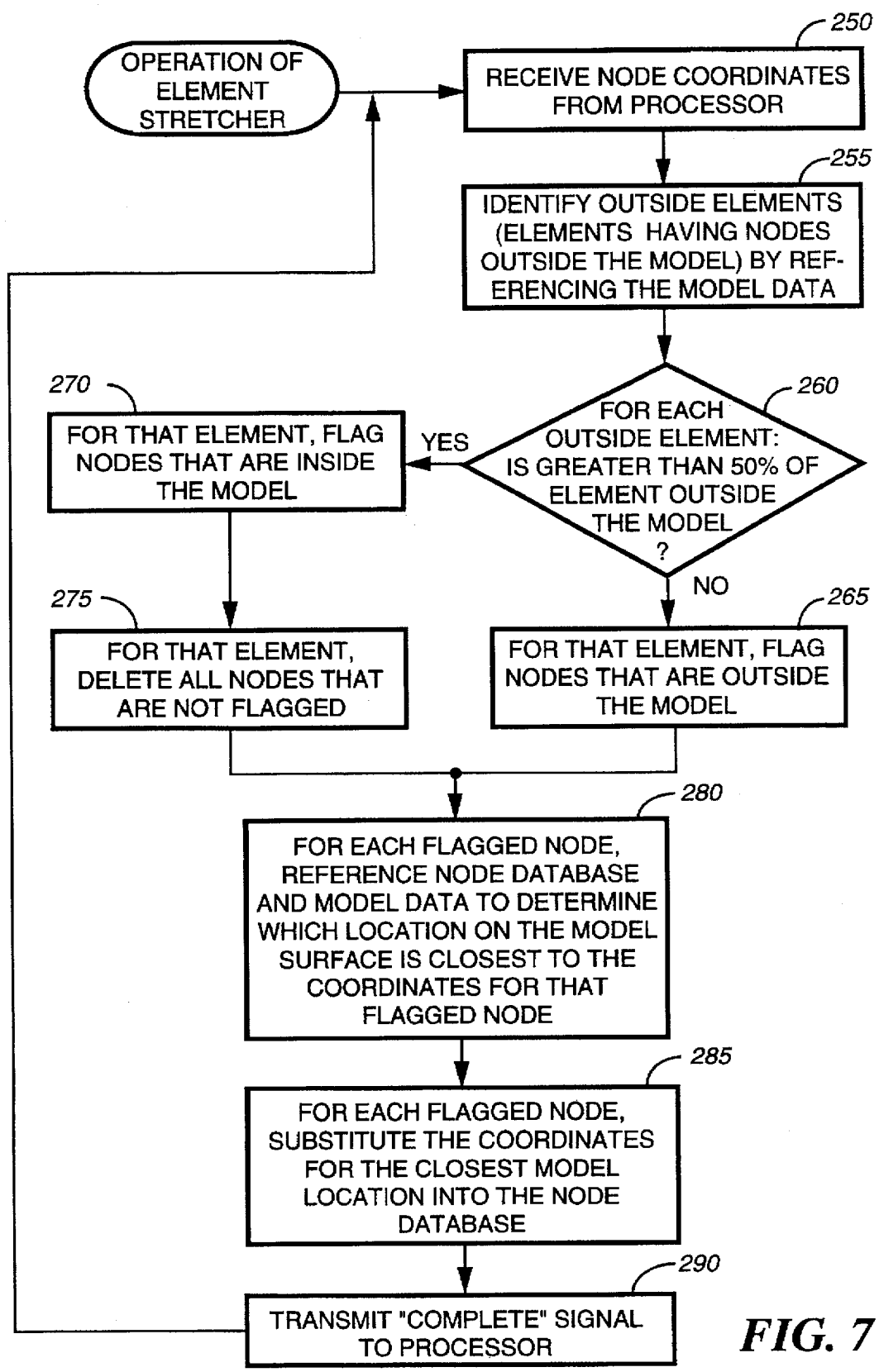
FIG. 7 is a flowchart depicting an operation of an element stretcher included in the computer of FIG. 1 in accordance with the present invention.

FIG. 7 is a flowchart of an operation of the element stretcher 135 included in the hexahedron mesher 128 according to the present invention. At step 250, the stretcher 135 receives the node coordinates for the elements included in the initial mesh. Then, at step 255, the stretcher 135 preferably identifies "outside" elements by referencing the model data. The outside elements are those elements that are included in the initial mesh and that have one or more nodes located outside the model. In other words, the stretcher 135 compares the stored nodes to the model data to determine whether nodes fall outside the surfaces defined by the model data. When a node is determined to be beyond the surfaces of the model, as defined by the model data, the element associated with that node is labeled as an outside element.

Thereafter, at step 260, the stretcher 135 processes each outside element to determine, with reference to the model data, whether greater than fifty percent (50%) of the volume of the element is outside the model. When greater than 50% of the volume of an outside element is not outside the surfaces defined by the model data, the nodes that are associated with that element and that are outside the model are flagged, at step 265. When greater than 50% of the volume of an outside element is determined to be outside of the model, the nodes that are associated with that element and that are inside the model are flagged, at step 270. When the inside nodes are flagged for an outside element, the element nodes that are not flagged are preferably deleted from the node database 145, at step 275.

In accordance with the present invention, the stretcher 135 then "stretches" each flagged node, at steps 280, 285, by modifying, for each flagged node, the node coordinates to more nearly approximate a location on a surface of the model. For instance, the stretcher 135 could compare, at step 280, the flagged nodes to the model data to determine modified node coordinates that solve stored mathematical equations or that are equivalent to stored surface coordinates. Alternatively, when the model data has been processed, in a prior operation, to result in a number of known locations on or near the surfaces of the model, the stretcher 135 could modify the stored node coordinates for the flagged nodes by substituting coordinates for the known locations, at step 285.

By way of example, the model surface could be approximated, either automatically or manually, by two-dimensional geometric shapes, such as triangles, having corners located relative to a known reference point. In such a circumstance, the stretcher 135, for each flagged node, substitutes the coordinates for the closest triangle corner for the node coordinates in the node database 145. After each flagged node has been stretched, at steps 280, 285, the stretcher 135 provides, at step 290, a "complete" signal to the processor 110 (FIG. 1) to indicate that the node database 145 has been modified to store coordinates indicative of a final hexahedron mesh.

The elements in the mesh could be stretched by methods other than that depicted in FIG. 7. By way of example, outside elements could be determined based upon different pre-programmed variables reprentative of predetermined volumes that are outside the model. When 35% of the volume of an element is outside the model, for instance, the element could be labeled as an outside element. Instead of identifying outside elements and flagging nodes, the hexahedron mesher 128 could select nodes within predetermined distances, outside or inside, of model surfaces. These identified nodes could then be stretched to more closely approximate model surfaces. Alternatively, methods could be used in which only nodes outside the surfaces are stretched or only nodes inside the surfaces are stretched. It will be appreciated that the elements could be stretched in any method that modifies the elements from their initial cubical shapes to better represent model surfaces.

Figure 8:
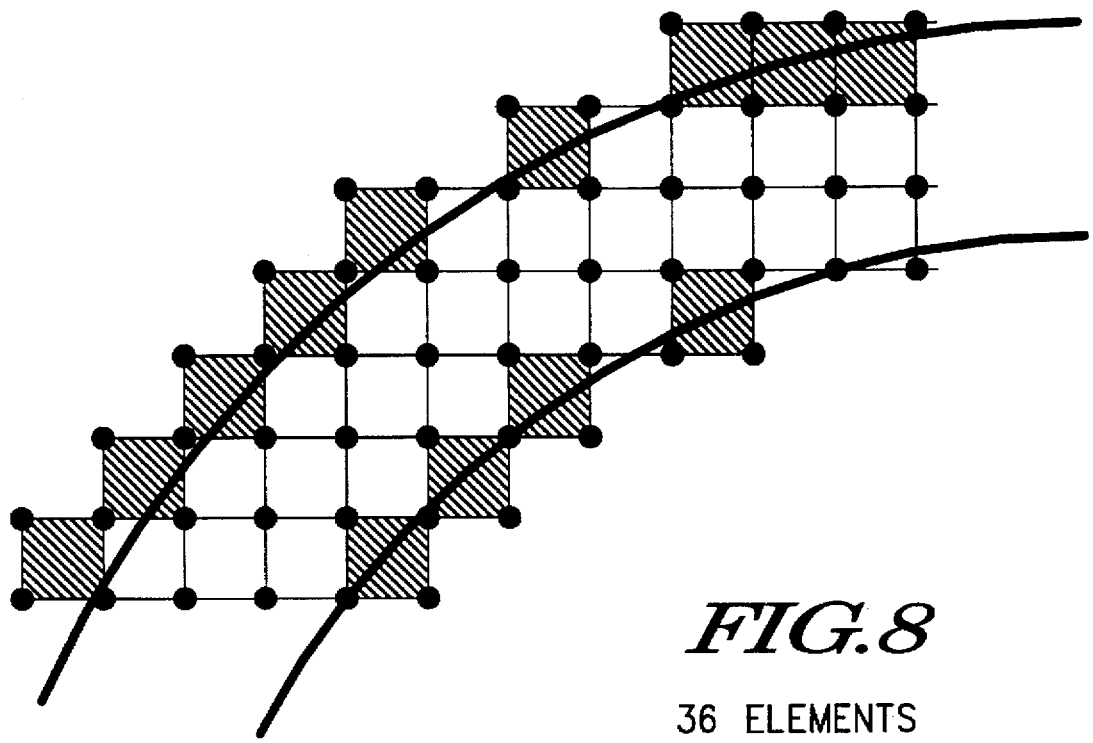
FIG. 8 is a cutaway side view of a hexahedron mesh generated by the element generator of FIG. 1 in accordance with the present invention.
Figure 9:
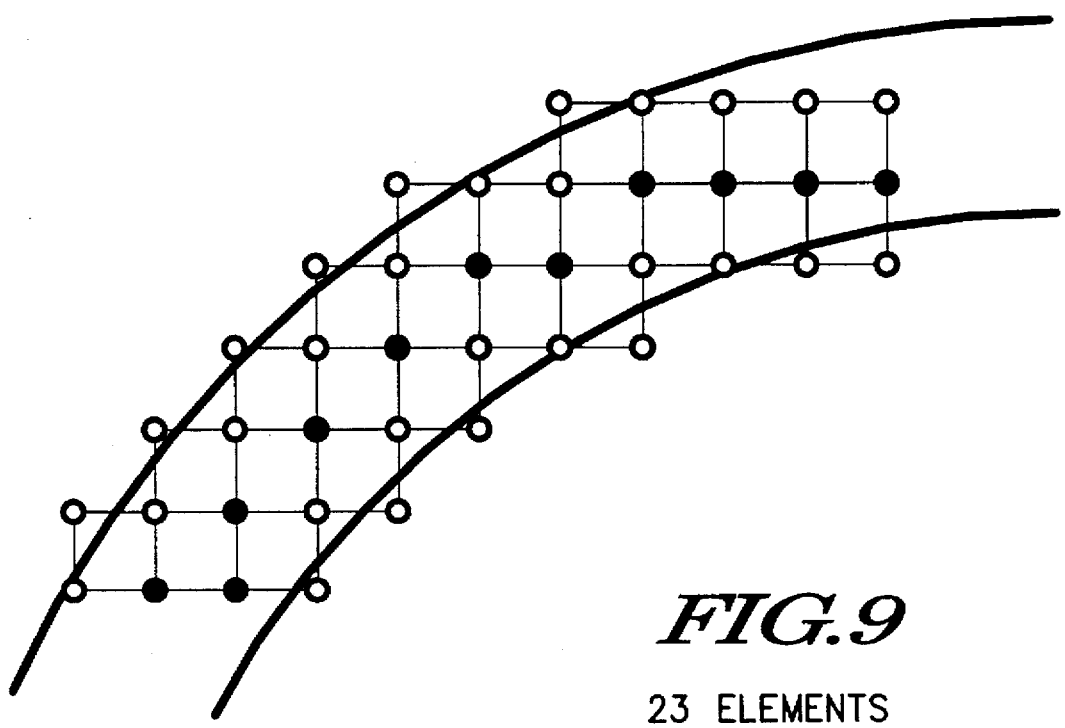
FIG. 9 is a cutaway side view of the hexahedron mesh of FIG. 8 after outside elements have been identified in accordance with the present invention.
Figure 10:
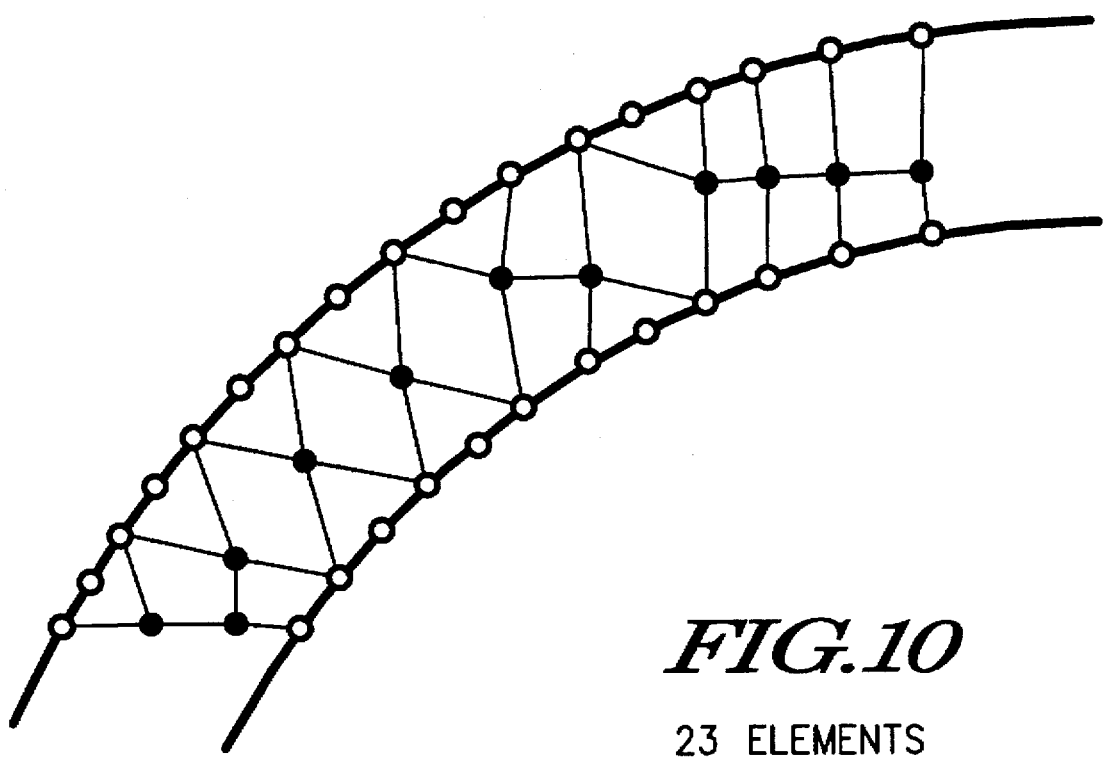
FIG. 10 is a cutaway side view of the hexahedron mesh of FIG. 8 after selected nodes have been processed by the stretcher of FIG. 1 in accordance with the present invention.

The operation of the hexahedron mesher 128 (FIG. 1) can be more easily understood by referring to FIGS. 8, 9, and 10. FIG. 8 is a cutaway, two-dimensional illustration of an initial mesh for a portion of a model. As shown, a mesh of thirty-six (36) hexahedrons, preferably cubes, has been formed to roughly approximate the model. The shaded cubes are cubes that are outside elements, i.e., elements having greater than 50% of their volumes outside the model. FIG. 9 illustrates the same mesh after selected nodes have been flagged and after the removal of elements that are more than 50% outside the model. The flagged nodes are represented by outlined circles that are not filled in. As shown, twenty-three elements remain in the mesh, and border nodes, i.e., nodes along the borders of the model surfaces, have been flagged for processing by the stretcher 135.

FIG. 10 is a two-dimensional view of the hexahedron mesh after the elements associated with the border nodes have been stretched, i.e., after the coordinates of the border nodes have been modified to lie on or near the model surfaces. Although not depicted clearly in the two-dimensional illustration of FIG. 10, all of the nodes, including the modified border nodes, still define hexahedral elements. The stretched hexahedral elements still have six sides, but each side is not necessarily the same length as other sides.

The hexahedron mesher 128 according to the present invention automatically generates a three-dimensional mesh of a model using hexahedrons. This is conveniently accomplished without requiring time-consuming, manual entry of coordinates defining the hexahedrons included in the mesh. Instead, the element generator 130 preferably generates gridlines in three dimensions to automatically form elements having at least one node within the mode. Other methods for forming the elements can alternatively be used, though. For example, the generator 130 could simply start at a location within the model and begin forming additional hexahedral elements outwards from the initial element until the complete initial mesh is built.

According to the present invention, after formation of the initial mesh, a portion of the elements in the mesh are stretched to more closely approximate model surfaces. As a result, rough edges are conveniently smoothed to conform to model surfaces. This ensures that finite element analysis is performed on a final mesh that is not only generated automatically, but is also a very accurate representation of the computer modeled structure.

Generating a hexahedron mesh in this manner is advantageous because it is done automatically without requiring manual entry of each hexahedron. Therefore, the hexahedron mesher 128 according to the present invention can form a mesh relatively quickly. For a model of a pager housing, for example, generating a mesh manually would require an estimated forty days for manual entry of the elements in the mesh. This amount of time is usually not available for most pager manufacturers. It is estimated that the automatic mesher 128 could produce the same mesh in approximately seven days. Contributing to this faster turnaround time is that face that, according to the present invention, all internal elements used by the mesher 128 are conveniently preconceived in shape and position. Only the surface elements are not completely known with respect to ultimate shape. However, the stretcher 135 advantageously and quickly forms the shapes of the surface elements from preconceived elements to conform to the model.

Figure 11:
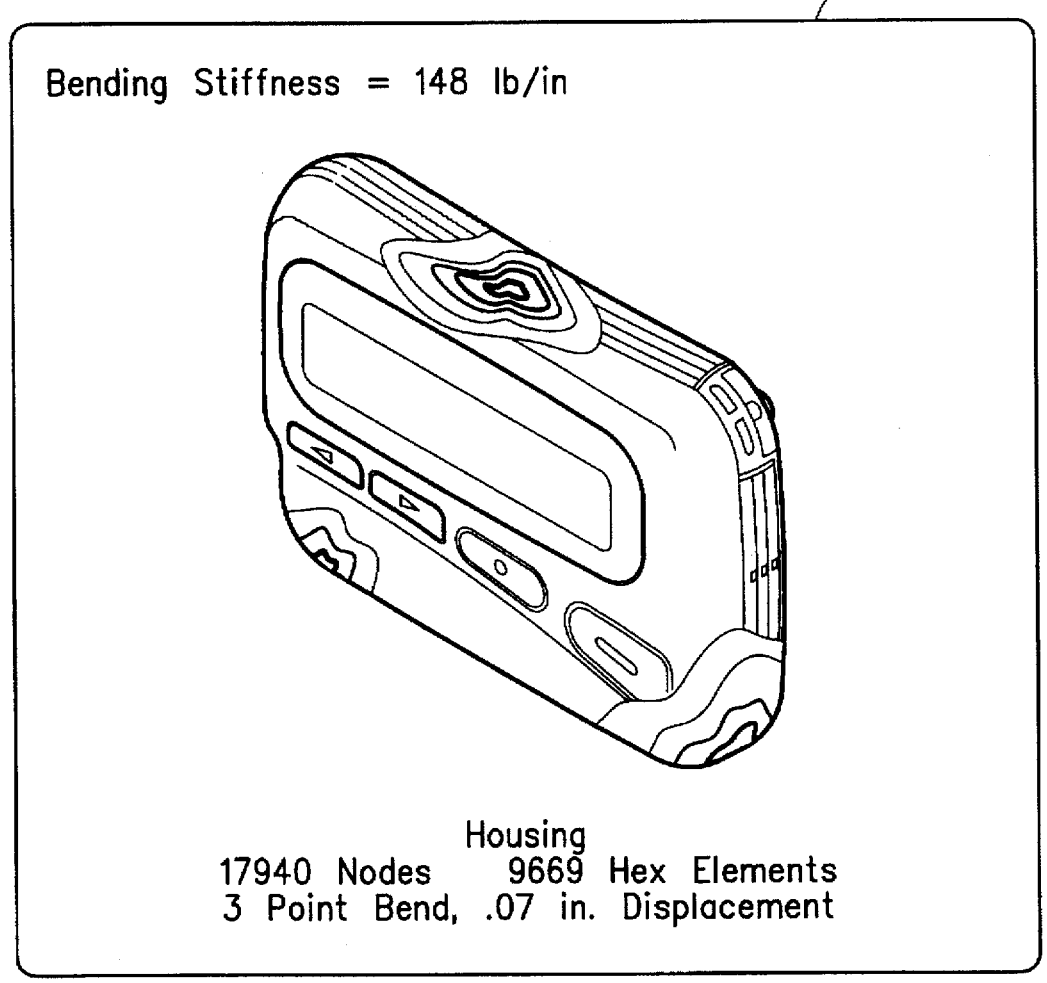
FIG. 11 is an illustration of the result of finite element analysis performed by the computer of FIG. 1 in accordance with the present invention.

As mentioned above, the generated hexahedron mesh is used in conventional finite element analysis by the analyzer 140 (FIG. 1). FIG. 11 is an illustration of the displayed result of such an analysis on the display 125. After the computer 100 has been provided with input conditions, such as a force to be exerted on the model, the analyzer 140 processes elements included in the hexahedron mesh to give results for the entire model. The results can be presented on the display 125 by illustrating various stresses and strains on the model using different representative colors, for example, or line thicknesses, as shown. Other results, such as bending stiffness, can be presented in text. As a result, the designer can conveniently determine the strengths and weaknesses of a part prior actually building it.

In summary, the hexahedron mesher according to the present invention automatically generates a hexahedron mesh of complex mechanical structures that have been modeled on a computer. As a result, meshes are advantageously formed that include elements recognized by most, if not all, conventional finite element analyzers. Furthermore, the results of the finite element analysis are very accurate since hexahedron meshes involve none of the problems, e.g., lack of mid-surface geometry, "stiffness," and lack of recognition by analyzers, associated with shell elements and tetrahedrons. The use of the automatic mesher in accordance with the present invention also conveniently reduced development cycle time because there is no need for a human operator to manually enter each hexahedral element in the mesh.

It will be appreciated by now that there has been provided a method and apparatus for rapidly forming hexahedron meshes of computer modeled devices.

What is claimed is:

1. A method, in a computer having a data entry device and a presentation device, for generating a hexahedron mesh of a computer modeled, mechanical structure, the method comprising the steps of:

receiving model data representative of a model through the data entry device;

generating gridlines in three dimensions to intersect the model, wherein the gridlines are spaced at predetermined intervals, and wherein gridline intersections comprise nodes;

forming hexahedral elements by locating the gridline intersections that define elements having at least one node within the model;

generating a mesh of the model using the hexahedral elements automatically without user intervention other than an initial user-initiated command;

performing finite element analysis on the mesh; and presenting results of the finite element analysis on the presentation device.

2. The method of claim 1, wherein the generating step comprises the step of:

generating the mesh of the model using the hexahedral elements, wherein the hexahedral elements comprise cubes.

3. The method of claim 1, further comprising the step of:

storing coordinates for the nodes that define the hexahedral elements included in the mesh.

4. The method of claim 1, further comprising the step of:

programming the predetermined intervals into the computer using the data entry device.

5. The method of claim 1, wherein the generating step comprises the steps of:

referencing the model data to determine a location within the model;

forming an element having a node at the location, wherein the hexahedral elements, including the element, each comprise nodes defining the hexahedral elements; and forming other elements outwards from the location until the model is entirely encompassed by the hexahedral elements.

6. The method of claim 5, further comprising the step of:

storing coordinates of the nodes defining the hexahedral elements.

7. The method of claim 6, further comprising the step of:

programming variables representative of size of the hexahedral elements using the data entry device.

8. The method of claim 1, further comprising the step of:

stretching selected elements of the hexahedral elements to more closely approximate the model.

9. The method of claim 8, further comprising, prior to the stretching step, the step of:

determining which of the hexahedral elements comprise the selected elements that are to be stretched.

10. The method of claim 9, wherein the determining step comprises the steps of:

referencing a memory to retrieve a variable indicative of a predetermined volume; and determining which of the hexahedral elements are outside elements that include volumes that are outside the model and that are equivalent to the predetermined volume, wherein the outside elements comprise the selected elements.

11. The method of claim 9, wherein the determining step comprises the step of:

determining which ones of the hexahedral elements are outside elements that have nodes within a predetermined distance outside the model, wherein the outside elements comprise the selected elements.

12. The method of claim 9, further comprising, prior to the stretching step, the step of:

storing coordinates of nodes that define the hexahedral elements.

13. The method of claim 12, wherein the stretching step comprises the steps of:

flagging some of the nodes associated with the selected elements to result in flagged nodes; and substituting the coordinates of the flagged nodes with coordinates indicative of locations on surfaces of the model by referencing the model data.

14. A computer for generating a mesh of a computer modeled, mechanical structure, the computer comprising:

a data entry device for receiving model data representative of a model;

a generator for generating gridlines in three dimensions to intersect the model, wherein gridline intersections comprise nodes, and for forming hexahedral elements by locating the gridline intersections that define elements having at least one node within the model;

a hexahedron mesher coupled to the generator for automatically generating a mesh of the model using the hexahedral elements without user intervention other than an initial user-initiated command;

an analyzer coupled to the hexahedron mesher for performing finite element analysis on the mesh; and a presentation device coupled to the analyzer for presenting results of the finite element analysis.

15. The computer of claim 14, wherein the hexahedral elements comprise cubes.

16. The computer of claim 14, further comprising a processor coupled to the hexahedron mesher, the data entry device, the analyzer, and the presentation device for controlling operation of the computer.

17. The computer of claim 14, further comprising a memory for storing the model data.

18. The computer of claim 14, wherein the hexahedron mesher further comprises:

a node database for storing coordinates of the nodes that define the hexahedral elements included in the mesh.

19. The computer of claim 18, wherein the gridlines are spaced at predetermined intervals.

20. The computer of claim 19, further comprising means for programming the predetermined intervals of the gridlines into the computer.

21. The computer of claim 19, further comprising means for programming variables representative of size of the hexahedral elements.

22. The computer of claim 18, wherein the hexahedron mesher further comprises:

a stretcher coupled to the node database and the generator for stretching selected elements of the hexahedral elements to more closely approximate the model.

23. The computer of claim 22, wherein the stretcher comprises means for determining which of the hexahedral elements comprise the selected elements that are to be stretched.

24. The computer of claim 22, wherein the stretcher comprises:

flagging means for flagging those of the nodes associated with the selected elements to result in flagged nodes; and substituting means for substituting the coordinates of the flagged nodes with coordinates indicative of locations on surfaces of the model by referencing the model data.

* * * * *